No. 883,582. PATENTED MAR. 31, 1908.
J. W. P. SMITHWICK.
DEVICE FOR AUTOMATICALLY CONTROLLING LAMPS ON VEHICLES.
APPLICATION FILED MAR. 22, 1907.
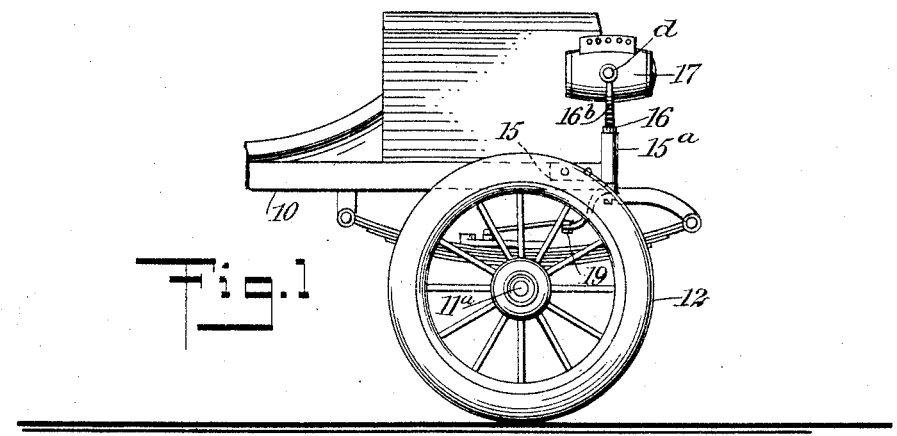
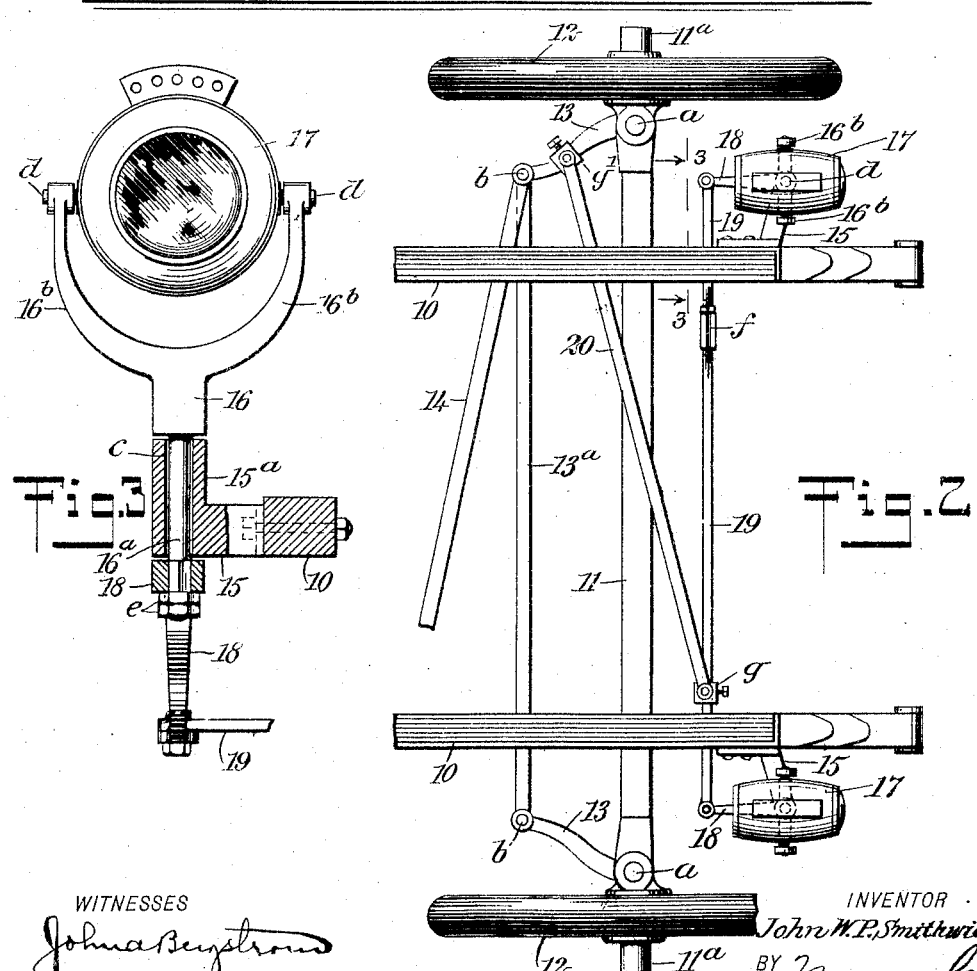
WITNESSES
INVENTOR
John W. P. Smithwick
BY Munn & Co
ATTORNEYS

UNITED STATES PATENT OFFICE.

JOHN WASHINGTON PEARCE SMITHWICK, OF LA GRANGE, NORTH CAROLINA.

DEVICE FOR AUTOMATICALLY CONTROLLING LAMPS ON VEHICLES.

No. 883,582.      Specification of Letters Patent.      Patented March 31, 1908.

Application filed March 22, 1907. Serial No. 363,792.

*To all whom it may concern:*

Be it known that I, JOHN W. P. SMITHWICK, a citizen of the United States, and a resident of La Grange, in the county of Lenoir and State of North Carolina, have invented a new and Improved Device for Automatically Controlling Lamps on Vehicles, of which the following is a full, clear, and exact description.

The purpose of this invention is to provide automatic means for controlling the lamps on automobiles or other wheeled vehicles, which will turn the lamps, so as to constantly throw their light in the direction of progressive movement had by the vehicle, and thus illuminate the roadway in front of the same.

The invention consists in the provision of lamp controlling means, and also of selected parts and their combination, as is hereinafter described and defined in the appended claims.

Reference is to be had to the accompanying drawings forming a part of this specification, in which similar characters of reference indicate corresponding parts in all the views.

Figure 1 is a side view of a front end portion of an automobile, and of details of the improvement mounted thereon; Fig. 2 is an enlarged plan view of the frame of an automobile, and of the lamp controller thereon; and Fig. 3 is an enlarged transverse sectional view of details taken substantially on the line 3—3 in Fig. 2, seen in direction of arrows in said figure.

In the drawings that show the improvement, and one means for carrying the principle into effect, 10 indicates side members of a frame for an automobile, which is selected as a preferred vehicle for displaying the improvement and its practical application. An axle 11 which supports the forward portion of the vehicle is carried by a pair of wheels 12 that are held free to rotate on stub spindles 11ª that are jointed upon end portions of the axle, as indicated at $a$ in Fig. 2. Upon the vertical pivot $a$ for each stub spindle 11ª an arm 13 is mounted and rigidly secured, said arms being preferably extended rearward and may be laterally curved toward each other, as shown in Fig. 2. The arms 13, are disposed in the same plane that may with advantage be horizontal, and on rear ends of the arms a corresponding end of a connecting rod 13ª is pivoted as at $b$, thus affording means for rocking the spindles 11ª simultaneously by an endwise movement of the connecting rod.

Upon one pivot $b$, an end of a link bar 14 is loosely mounted, and thence extends a distance across the vehicle frame, to have its remaining end mounted upon the lower end of a vertical shaft not shown, that carries a hand wheel, not shown.

The constructive details that have been described are well known, and afford means for rocking the front wheels 12 laterally, and thus control the movement of the vehicle to give it a desired direction while in motion. The novel mechanism for simultaneously and correspondingly rocking one or more lamps, at the front of the automobile, will now be described.

Upon the front portion of each side member 10 of the automobile frame, a bracket arm 15 is secured, and projects therefrom a suitable distance, each arm having an upright member 15ª that is axially perforated as at $c$ in Fig. 3. In the vertical perforation $c$ a cylindrical stem 16ª, that is the lower portion of a lamp standard 16, is loosely inserted, said standard in complete form having two limbs 16ᵇ that are spaced apart for reception between them of the body 17, of one of the lamps which may be of any preferred construction, (the lamp body being supported on the upper ends of the limbs 16ᵇ as indicated in Figs. 2 and 3). Upon the lower end of each stem 16ª the perforated hub end of a preferably curved arm 18, is secured firmly by means of two jam nuts $e$ that engage the projecting threaded lower end of said stem, and are forcibly impinged upon each other and on the arm mentioned as is clearly shown in Fig. 3.

The curved arms 18, as shown, are projected rearwardly, but this may be changed and said arms may be forwardly disposed, if the style and construction of running gears of the vehicle require it. The relative arrangement of the arms 18 is such with regard to the lamp bodies 17, that the latter will be disposed in the same plane parallel with each other, and likewise with that of the frame members 10, when the arms 18 are projected rearwardly, and parallel with the plane of said frame members 10, this relative arrangement of parts being clearly shown in Fig. 2. A rocking bar 19 is employed for the connection of rear ends of the curved arms 18, by pivoting respective ends of said rocking bar thereon. As represented in Fig. 2, the rocking bar 19 is rendered adjustable for length by means of a turn buckle or sleeve nut f, that has a threaded engagement with ends of the bar which are disposed adjacent to each other, it being understood that the rocking bar is formed of two pieces connected as explained.

The provision of a longitudinally adjustable rocking bar is of advantage in giving the lamps a proper position and dispose their axes in parallel planes, and it also is advantageous for adapting the length of said bar 19, to conform with the width of various styles of automobiles. A shifting rod 20 is connected by its ends, respectively, upon the rocking bar 19, and one of the arms 13. Preferably to facilitate the pivotal connection of the shifting rod with the parts mentioned, two box clamps g, g' are respectively mounted and clamped upon the arm 13, and rocking bar 19, whereon they are affixed by means of set screws, these boxes receiving pivot bolts that pass loosely through end portions of the shifting rod.

It will be apparent from the foregoing description that the manipulation of the controlling mechanism for the forward wheels 12, will simultaneously and correspondingly transmit directive movement to the lamps so that they will be turned as the vehicle turns, and always throw their light directly in front of the automobile.

The device is extremely simple, and may be readily adapted for use on any automobile, and may also be applied upon other vehicles that have stub spindles and means such as described for directive control of the wheels mounted on said spindles.

As many changes of a subordinate character may be made without departure from the controlling principle of my invention, I claim all such deviations from the precise construction shown, as will fall within the scope of the subjoined claims.

Having described my invention, I claim as new and desire to secure by Letters Patent:

1. The combination with a vehicle frame, a front axle, stub spindles pivoted to the ends of the axle, wheels on the spindles, rearwardly extending arms on the spindles, a rod connecting the arms, and means for manually controlling the pivotal movement of the spindles, of brackets secured to the frame in front of the axle and each having an upright member provided with a vertical opening, bifurcated standards mounted to turn in the openings of the brackets, lamps pivoted on horizontal pivots between the members of the standards, downwardly curved arms rigidly secured to the lower ends of said standards, a rod connecting the arms of the standards, said rod comprising two sections pivoted at one end to the arms and having their other ends screw threaded and a turn buckle on the screw threaded ends of the rods, adjustable boxes, one on the said rod and the other on an arm of one of the spindles, and a rod extending diagonally across the axle and having its ends pivoted to the said boxes.

2. In an automatic lamp controlling device for vehicles, the combination of a vehicle frame, a front axle, stub spindles pivoted to the ends of the axle, wheels on the spindles, rearwardly extending arms on the spindles, a rod connecting the arms, means for manually controlling the pivotal movement of the spindles, brackets secured to the frame in front of the axle and provided with vertical openings, bifurcated standards mounted to turn in the openings of the brackets and having their lower ends projecting through the same, lamps pivoted on horizontal pivots between the members of the standards, downwardly and rearwardly extending arms rigidly secured to the lower ends of the standards, a rod connecting the arms of the standards, adjustable boxes, one on the said rod and the other on an arm of one of the spindles, and a rod extending diagonally across the axle and having its ends pivoted to the said boxes.

In testimony whereof I have signed my name to this specification in the presence of two subscribing witnesses.

JOHN WASHINGTON PEARCE SMITHWICK.

Witnesses:
W. H. WALTERS,
D. L. FIELDS.